United States Patent
Chen et al.

(10) Patent No.: US 10,911,642 B1
(45) Date of Patent: Feb. 2, 2021

(54) IMAGE PROCESSING CIRCUIT AND IMAGE PROCESSING METHOD

(71) Applicant: Realtek Semiconductor Corp., HsinChu (TW)

(72) Inventors: Huan-Wen Chen, Hsinchu County (TW); Po-Hsien Wu, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/853,762

(22) Filed: Apr. 21, 2020

(30) Foreign Application Priority Data

Aug. 27, 2019 (TW) .............................. 108130536 A

(51) Int. Cl.
*H04N 5/06* (2006.01)
*H04N 5/073* (2006.01)
*H04N 7/088* (2006.01)

(52) U.S. Cl.
CPC ............... *H04N 5/06* (2013.01); *H04N 5/073* (2013.01); *H04N 7/088* (2013.01)

(58) Field of Classification Search
CPC ........................................................ H04N 5/783
See application file for complete search history.

(56) References Cited

U.S. PATENT DOCUMENTS

| | | | | |
|---|---|---|---|---|
| 5,589,944 A * | 12/1996 | Young | ..................... | H04N 5/913 360/60 |
| 2005/0068424 A1 * | 3/2005 | Kaneko | .............. | H04N 5/23227 348/222.1 |
| 2005/0163492 A1 * | 7/2005 | Ueda | ....................... | H04N 5/783 386/228 |
| 2006/0013507 A1 * | 1/2006 | Kaneko | ................... | H04N 7/013 382/312 |
| 2006/0017847 A1 * | 1/2006 | Tardif | ...................... | G09G 5/12 348/536 |
| 2010/0283792 A1 * | 11/2010 | Chen | .................... | G09G 3/3611 345/544 |
| 2011/0249073 A1 * | 10/2011 | Cranfill | ................ | H04N 5/2258 348/14.02 |
| 2011/0292187 A1 * | 12/2011 | Chen | .................... | H04N 13/341 348/51 |
| 2013/0235014 A1 * | 9/2013 | Lee | ........................ | G06F 1/3265 345/211 |

FOREIGN PATENT DOCUMENTS

TW 201243821 A1 11/2012

* cited by examiner

*Primary Examiner* — Paulos M Natnael
(74) *Attorney, Agent, or Firm* — Winston Hsu

(57) ABSTRACT

The present invention discloses an image processing circuit including an image processing unit, a frame rate adjusting circuit and a phase detection and control circuit. In operations of the image processing circuit, the image processing unit is configured to process an input image signal including a plurality of frames to generate a processed image signal including a plurality of processed frames, the frame rate adjusting circuit is configured to adjust a row number of vertical blanking intervals of at least one of the processed frames according to a control signal, to generate an output image signal including at least one adjusted frame, and the phase detection and control circuit is configured to determine a phase relationship of the input image signal or the processed image signal and the output image signal to generate the control signal.

6 Claims, 6 Drawing Sheets

IMAGE PROCESSING CIRCUIT AND IMAGE PROCESSING METHOD

BACKGROUND OF THE INVENTION

1. Field of the Invention

The present invention is related to image processing, and more particularly, to an image processing method (e.g. a phase tracking method) applied to a display device.

2. Description of the Prior Art

A display device may have an image processing chip installed therein to adjust color, brightness and resolution of an input image signal. An output image signal is then generated to a display panel for being displayed thereon. Performing the above operations on the input image signal may introduce signal delay, however, so that a phase difference between the input image signal and the output image signal is not fixed. This may introduce image picture delay, resulting in the image and audio not being synchronous. Conventional methods typically control a frequency of a clock signal to adjust the frame rate of the output image signal, thus making the phase difference between the input image signal and the output image signal maintained at a fixed value as much as possible. As the display panel may limit the frequency of the clock signal of the received output image signal within a narrow range, it may take a long time to lock the phase difference between the input image signal and the output image signal, which affects the display quality.

SUMMARY OF THE INVENTION

This in mind, an objective of the present invention is to provide an image processing method which adjusts the frame rate of the output image signal via adjusting vertical blanking intervals of frames in order to quickly lock the phase difference between the input image signal and the output image signal, to solve the problem of the related art.

In an embodiment of the present invention, an image processing circuit is disclosed. The image processing circuit comprises an image processing unit, a frame rate adjusting circuit, and a phase detection and control circuit. In operations of the image processing circuit (e.g. phase tracking operations), the image processing unit is configured to process an input image signal comprising a plurality of frames for generating a processed image signal comprising a plurality of processed frames. The frame rate adjusting circuit is configured to adjust a row number of vertical blanking intervals of at least one of the processed frames according to a control signal for generating an output image signal comprising at least one adjusted frame. The phase detection and control circuit is configured to receive the input image signal or the processed image signal and the output image signal, and determine a phase relationship of the input image signal or the processed image signal and the output image signal for generating the control signal.

In another embodiment of the present invention, an image processing method (e.g. a phase tracking method) is disclosed. The image processing method comprises the following steps: processing an input image signal comprising a plurality of frames for generating a processed image signal comprising a plurality of processed frames; adjusting a row number of vertical blanking intervals of at least one of the processed frames according to a control signal for generating an output image signal comprising at least one adjusted frame; and determining a phase relationship of the input image signal or the processed image signal and the output image signal for generating the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
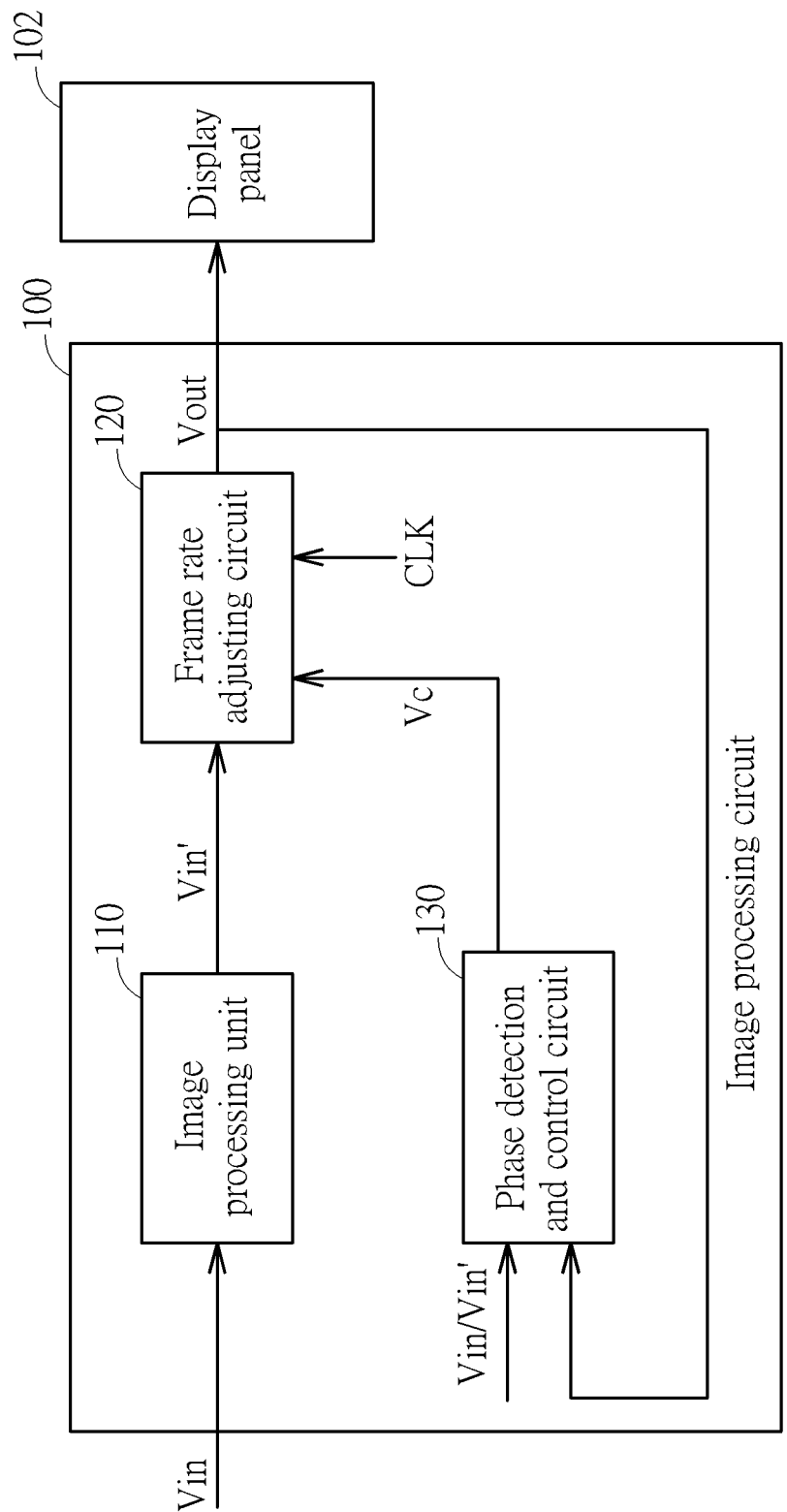
FIG. 1 is a diagram illustrating an image processing circuit according to an embodiment of the present invention.

FIG. 1 is a diagram illustrating an image processing circuit 100 according to an embodiment of the present invention. As shown in FIG. 1, the image processing circuit 100 comprises an image processing unit 110, a frame rate adjusting circuit 120, and a phase detection and control circuit 130. In this embodiment, the image processing circuit 100 is applied to a display device. For example, the image processing circuit 100 may be installed in a display device such as a television, and be configured to process an input image signal Vin from outside or inside for generating an output image signal Vout to a display panel 102. In addition, the image processing circuit 100 may be installed in a set-top-box, and be configured to process the input image signal Vin from outside for generating the output image signal Vout to the display panel 102 within a monitor.

In operations of the image processing circuit 100, the image processing unit 110 receives the input image signal Vin, and generates a processed image signal Vin' after performing adjustment such as color, brightness, resolution and/or image interpolation on the input image signal Vin, wherein the input image signal Vin comprises a plurality of frames, and the processed image signal Vin' comprises a plurality of processed frames. The frame rate adjusting circuit 120 adjusts a row number of vertical blanking intervals of at least one processed frame within the processed image signal Vin' according to a control signal Vc in order to adjust a frame rate of said at least one processed frame included in the processed image signal Vin', and the output image signal Vout is then generated to the display panel 102 for being displayed. In addition, in order to maintain a phase difference between the input image signal Vin and the output image signal Vout at a fixed value, the phase detection and control circuit 130 determines a phase relationship between the input image signal Vin and the output image signal Vout for generating the control signal Vc, which makes the frame rate adjusting circuit 120 dynamically adjust the row number of the vertical blanking intervals of said at least one processed frame within the processed image signal Vin'.

In another embodiment of the present invention, the phase detection and control circuit 130 may determine a phase relationship between the processed image signal Vin' and the output image signal Vout to generate the control signal Vc, which makes the frame rate adjusting circuit 120 dynamically adjust the row number of the vertical blanking intervals of said at least one processed frame within the processed image signal Vin'. For better understanding, the phase detection and control circuit 130 determining the relationship between the input image signal Vin and the output image signal Vout is detailed in the following embodiments, but the present invention is not limited thereto.

Figure 2:
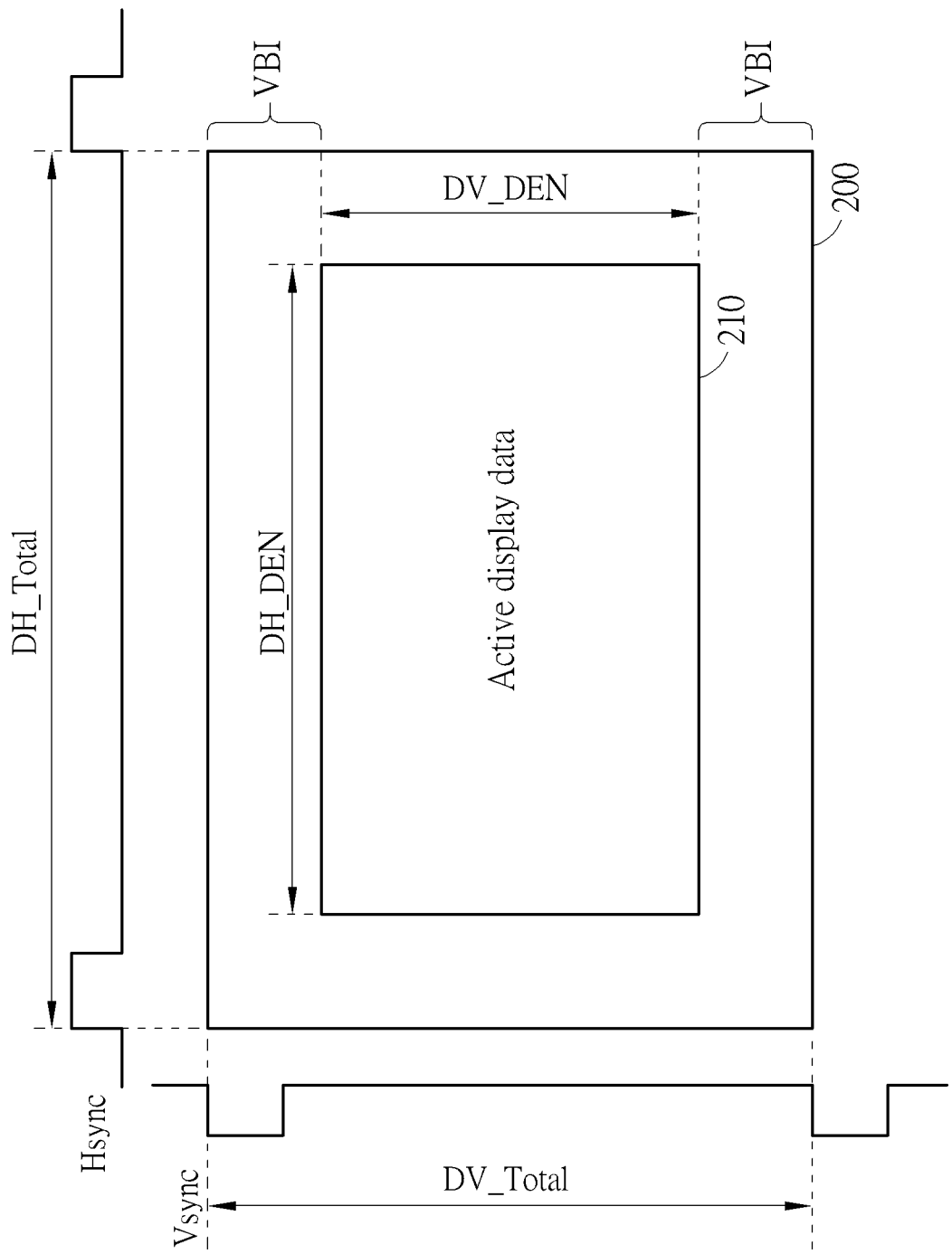
FIG. 2 is a diagram illustrating an image frame.

Refer to FIG. 2, which is a diagram illustrating an image frame 200. As shown in FIG. 2, the image frame 200 is a region between horizontal synchronous data Hsync and vertical synchronous data Vsync, and a length and a width of the image frame are respectively labeled DH_Total and DV_Total in this embodiment. The image frame 200 comprises active display data 210, vertical blanking intervals and horizontal blanking intervals, where the vertical blanking intervals are regions labeled "VBI" above and below the active display data 210, and a length and a width of the active display data 210 are respectively labeled DH_DEN and DV_DEN in this embodiment. In an example, a size of the image frame 200 may be 4400*2250 pixels (e.g. DH_Total=4400, DV_Total=2250), and a size of the active display data 210 may be 3840*2160 pixels (e.g. DH_DEN=3840, DV_DEN=2160). As the architecture of the image frame 200 is well known by those skilled in the art, related detail is omitted for brevity.

In this embodiment, assuming that the image frame 200 is configured to represent a processed frame within the processed image signal Vin', the frame rate adjusting circuit 120 may increase the row number of the vertical blanking intervals within the image frame 200. Increasing the row number of the vertical blanking intervals means increasing DV_Total, where increasing DV_Total may delay a time point of the next enablement of the vertical synchronous data Vsync, introducing a phase delay of the output image signal Vout and reducing the frame rate. By comparison, the frame rate adjusting circuit 120 may reduce the row number of the vertical blanking intervals within the image frame 200. Reducing the row number of the vertical blanking intervals means reducing DV_Total, where reducing DV_Total may advance the time point of the next enablement of the vertical synchronous data Vsync, thereby advancing the phase of the output image signal and increasing the frame rate. As mentioned above, by increasing or reducing the row number of the vertical blanking intervals, the phase of the output image signal Vout can be effectively adjusted to maintain the phase difference between the input image signal Vin and the output image signal Vout at a fixed value.

Figure 3:
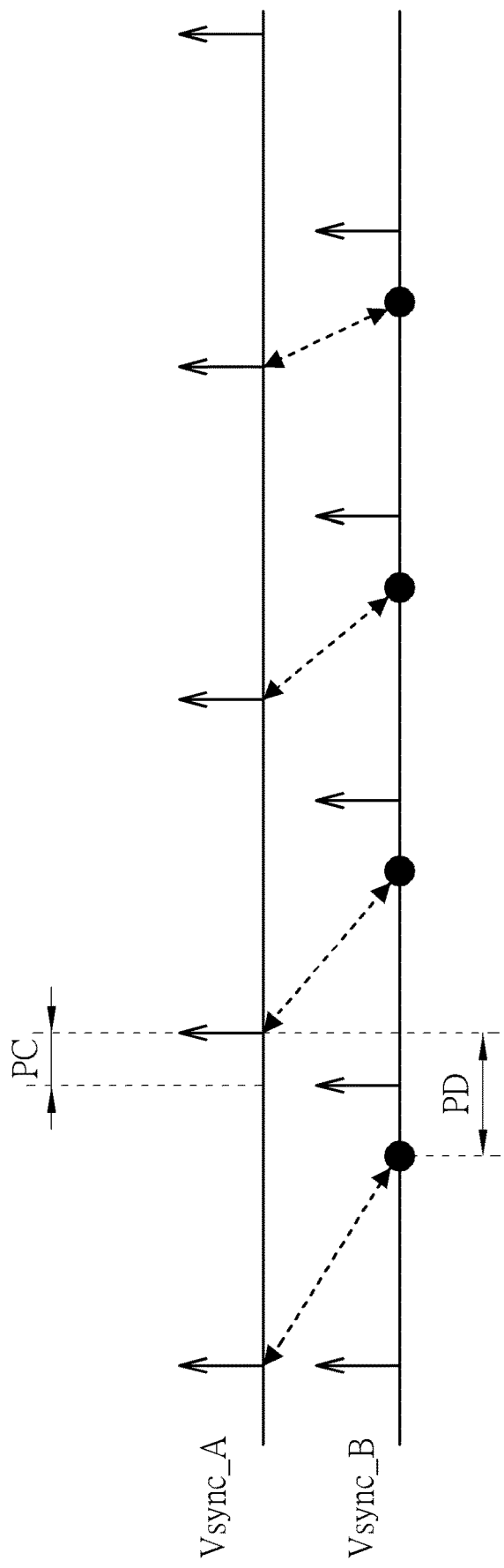
FIG. 3 is a diagram illustrating a row number of vertical blanking intervals being reduced to advance a phase of a vertical synchronous within an output image signal.

Refer to FIG. 3. In an embodiment, assume that a vertical synchronous signal within the input image signal Vin is represented by "Vsync_A" and a vertical synchronous signal within the output image signal Vout is represented by "Vsync_B", and an ideal phase difference between Vsync_A and Vsync_B is "PD" as shown in the figures (i.e. ideally, an enable time of the vertical synchronous signal Vsync_A is located at the dot(s)). The phase detection and control circuit 130 may compare a phase difference between Vsync_A and Vsync_B with the ideal phase difference PD to determine to increase or reduce the row number of the vertical blanking intervals (the number of the vertical blanking intervals is reduced in this embodiment as shown by PC in FIG. 3), and accordingly generate the control signal Vc to control the frame rate adjusting circuit 120 to reduce the row number of the vertical blanking intervals. This increases the frame rate, advancing the phase of the vertical synchronous signal Vsync_B within the output image signal Vout, thereby making the phase difference between Vsync_A and Vsync_B approach the ideal phase difference PD.

Figure 4:
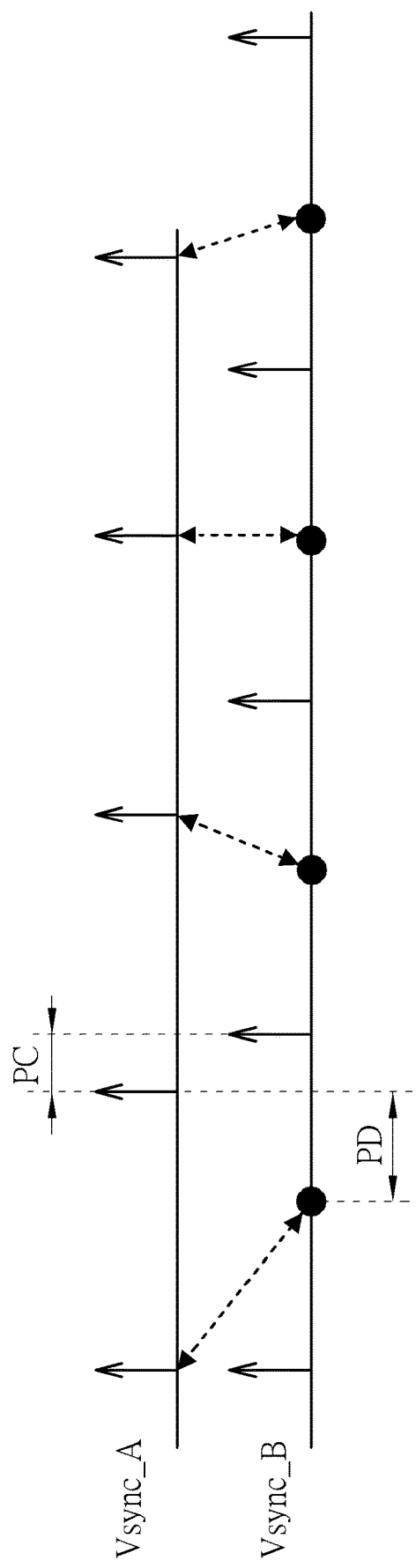
FIG. 4 is a diagram illustrating a row number of vertical blanking intervals being increased to delay a phase of a vertical synchronous within an output image signal.

Refer to FIG. 4. In another embodiment, assume that a vertical synchronous signal within the input image signal Vin is represented by "Vsync_A" and a vertical synchronous signal within the output image signal Vout is represented by "Vsync_B", and an ideal phase difference between Vsync_A and Vsync_B is "PD" as shown in the figures. The phase detection and control circuit 130 may compare a phase difference between Vsync_A and Vsync_B with the ideal phase difference PD to determine to increase or reduce the row number of the vertical blanking intervals (the number of the vertical blanking intervals is increased in this embodiment as shown by PC in FIG. 4), and accordingly generate the control signal Vc to control the frame rate adjusting circuit 120 to increase the row number of the vertical blanking intervals, for reducing the frame rate and advancing the phase of the vertical synchronous signal Vsync_B within the output image signal Vout, to make the phase difference between Vsync_A and Vsync_B approach the ideal phase difference PD.

In this embodiment, the row number of the vertical blanking intervals has greater adjustment space in a general specification of the display panel 102, e.g. the display panel 102 may allow the width DV_Total of the received image frame 200 to be within 2100-2700. As the adjustment range of the vertical blanking intervals is large, the phase of the output image signal Vout can be quickly adjusted (i.e. the vertical synchronous signal Vsync_B in FIG. 3 and FIG. 4 has greater phase shift amounts), to quickly achieve the purpose of locking the phases of the input image signal Vin and the output image signal Vout.

In an embodiment, the frame rate adjusting circuit 120 utilizes a clock signal CLK to transmit the output image signal Vout to the display panel 102, and a frequency of the clock signal CLK will not vary according to the control signal Vc generated by the phase detection and control circuit 130.

Figure 5:
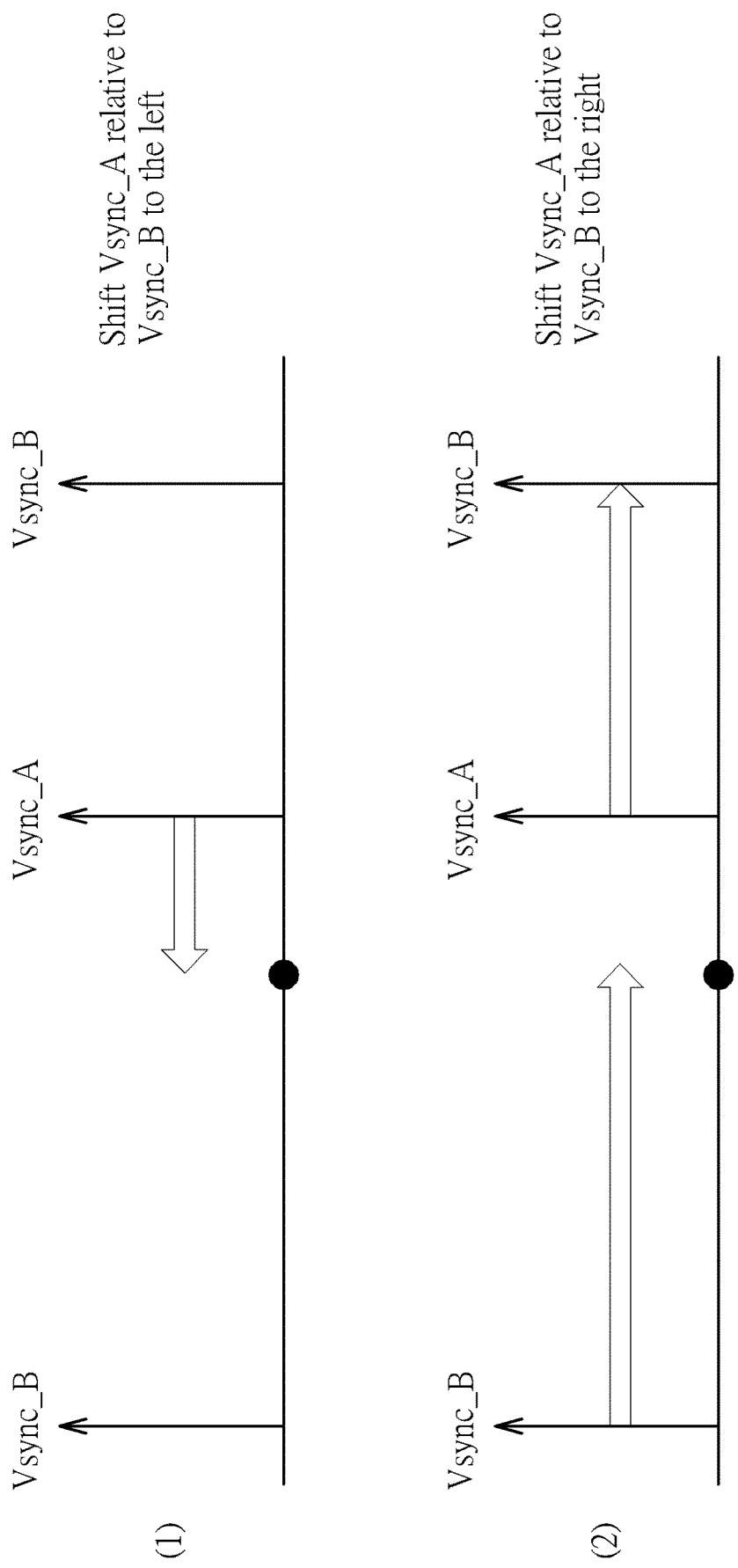
FIG. 5 is a diagram illustrating a phase of a vertical synchronous signal being adjusted in different directions.

In an embodiment, as the amount for increasing the row number of the vertical blanking intervals is different from the amount for reducing the row number of the vertical blanking intervals in the specification of the display panel 102 (e.g. the allowed reduced row number of the vertical blanking intervals is "150", and the allowed increased row number of the vertical blanking intervals is "450"), the phase detection and control circuit 130 may determine to increase or reduce the row number of the vertical blanking intervals of the image frames according to image frame numbers for adjusting the phase of the vertical synchronous signal Vsync_B of the output image signal Vout in different directions. Taking FIG. 5 as an example, the phase detection and control circuit 130 may calculate an image frame number for shifting the phase of the vertical synchronous signal Vsync_A of the input image signal Vin relative to the vertical synchronous signal Vsync_B to the left of the dot (s) in the figures (i.e. increasing the row number of the vertical blanking intervals to delay the phase of the vertical synchronous signal Vsync_B), and calculate an image frame number for shifting the phase of the vertical synchronous signal Vsync_A of the input image signal Vin relative to the vertical synchronous signal Vsync_B to the right of the dot(s) in the figures (i.e. reduce the row number of the vertical blanking intervals to advance the phase of the vertical synchronous signal Vsync_B), and select the direction requiring the lower image frame number for adjustment. In detail, if the frame number for increasing the phase of the vertical synchronous signal Vsync_B is less than the frame number for reducing this phase, the phase detection and control circuit 130 determines to increase the row number of the vertical blanking intervals, and accordingly generates the control signal Vc; and if the frame number for increasing the phase of the vertical synchronous signal Vsync_B is greater than the frame number for reducing this phase, the phase detection and control circuit 130 determines to reduce the row number of the vertical blanking intervals, and accordingly generates the control signal Vc. For example, assume that a row number of increased vertical blanking intervals for shifting the phase of the vertical synchronous signal Vsync_A relative to the vertical synchronous signal Vsync_B to the left of the dot(s) in the figures is "1000", and the allowed increased row number of vertical blanking intervals for the display panel 102 is "450", the required adjusting image frame number is 3 (i.e. the first two image frames increase by 450 rows, and the third image frame increases by 100 rows). In addition, assume that a row number of reduced vertical blanking intervals for shifting the phase of the vertical synchronous signal Vsync_A relative to the vertical synchronous signal Vsync_B to the right of the dot (s) in the figures is "500", and the allowed reduced row number of vertical blanking intervals for the display panel 102 is "150", the required adjusting image frame number is 4 (i.e. each of the first three image frame is reduced by 150 rows, and the fourth image frame is reduced by 50 rows).

Figure 6:
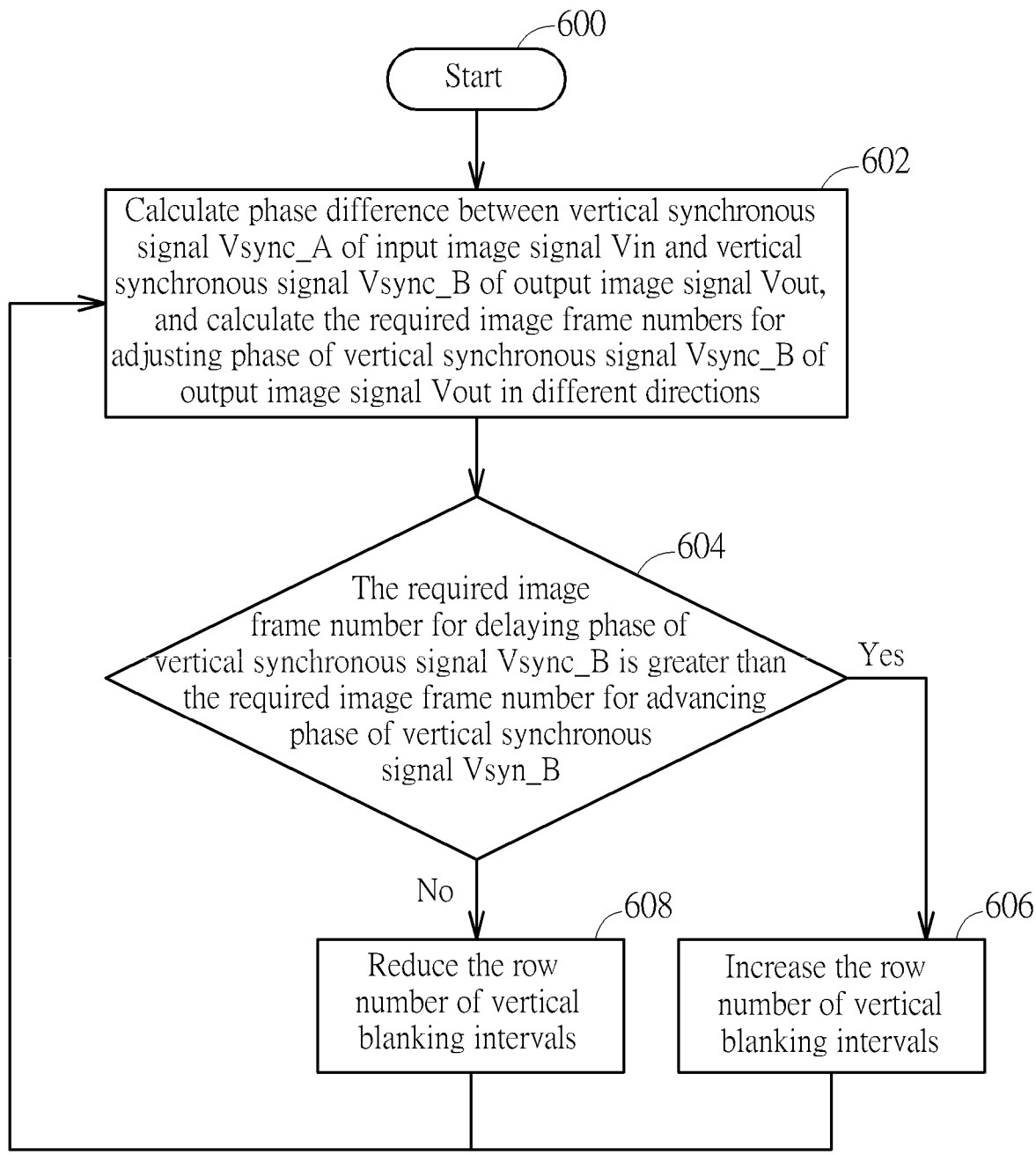
FIG. 6 illustrates a flowchart of an image processing method (e.g. a phase tracking method) according to an embodiment of the present invention.

FIG. 6 illustrates a flowchart of an image processing method (e.g. a phase tracking method) according to an embodiment of the present invention. Referring to FIGS. 1-5 and the above descriptions, the flow is as follows.

Step 600: start.

Step 602: calculate a phase difference between the vertical synchronous signal Vsync_A of the input image signal Vin and the vertical synchronous signal Vsync_B of the output image signal Vout, and calculate the required image frame numbers for adjusting the phase of the vertical synchronous signal Vsync_B of the output image signal Vout in different directions (e.g. advance or delay).

Step 604: determine whether the required image frame number for delaying the phase of the vertical synchronous signal Vsync_B is greater than the required image frame number for advancing the phase of the vertical synchronous signal Vsyn_B. If yes, the flow enters Step 606; if no, the flow enters Step 608.

Step 606: increase the row number of the vertical blanking intervals.

Step 608: reduce the row number of the vertical blanking intervals.

Briefly summarized, the image processing circuit and associated method of the present invention achieves the purpose of quickly locking phases of the input image signal and the output image signal via adjusting the row number of the vertical blanking intervals of image frames. Thus, in comparison with the related art method of adjusting phase via adjusting the frequency of the clock signal, the present invention can have a better phase tracking/locking speed, and thereby efficiently reduces picture delay and synchronizes image and audio to improve the display quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
an image processing unit, configured to process an input image signal comprising a plurality of frames to generate a processed image signal comprising a plurality of processed frames;
a frame rate adjusting circuit, configured to adjust a row number of vertical blanking intervals of at least one of the processed frames according to a control signal, to generate an output image signal comprising at least one adjusted frame; and
a phase detection and control circuit, configured to receive the input image signal or the processed image signal and the output image signal, and determine a phase relationship of the input image signal or the processed image signal and the output image signal to generate the control signal;
wherein the phase detection and control circuit detects a phase difference between vertical synchronous signals of the input image signal or the processed image signal and the output image signal, to generate the control signal for controlling the frame rate adjusting circuit to adjust the row number of the vertical blanking intervals of said at least one of the processed frames, to maintain the phase difference between the vertical synchronous signals of the input image signal or the processed image signal and the output image signal at a fixed value.

2. The image processing circuit of claim 1, wherein when the phase difference between the vertical synchronous signals of the input image signal or the processed image signal and the output image signal is different from the fixed value, the phase detection and control circuit determines to increase or reduce the row number of the vertical blanking intervals of said at least one of the processed frames according to frame numbers for adjusting a phase of the vertical synchronous signal of the output image signal in different directions, and accordingly generates the control signal.

3. The image processing circuit of claim 2, wherein if the frame number for increasing the phase of the vertical synchronous signal of the output image signal is less than the frame number for reducing the phase, the phase detection and control circuit determines to increase the row number of the vertical blanking intervals of said at least one of the processed frames, and accordingly generates the control signal.

4. The image processing circuit of claim 2, wherein if the frame number for increasing the phase of the vertical synchronous signal of the output image signal is greater than the frame number for reducing the phase, the phase detection and control circuit determines to reduce the row number of the vertical blanking intervals of said at least one of the processed frames, and accordingly generates the control signal.

5. The image processing circuit of claim 2, wherein the frame rate adjusting circuit utilizes a clock signal to transmit the output image signal to a display panel, and a frequency of the clock signal does not vary according to the control signal generated by the phase detection and control circuit.

6. An image processing method, comprising:
processing an input image signal comprising a plurality of frames to generate a processed image signal comprising a plurality of processed frames;
adjusting a row number of vertical blanking intervals of at least one of the processed frames according to a control signal, to generate an output image signal comprising at least one adjusted frame; and
determining a phase relationship of the input image signal or the processed image signal and the output image signal to generate the control signal;
wherein the step of determining the phase relationship of the input image signal or the processed image signal and the output image signal to generate the control signal comprises:
  detecting a phase difference between vertical synchronous signals of the input image signal or the processed image signal and the output image signal, to generate the control signal; and
the step of adjusting the row number of the vertical blanking intervals of said at least one of the processed frames according to the control signal to generate the output image signal comprising said at least one adjusted frame comprises:
  adjusting the row number of the vertical blanking intervals of said at least one of the processed frames, to maintain the phase difference between the vertical synchronous signals of the input image signal or the processed image signal and the output image signal at a fixed value.

* * * * *